June 3, 1952   P. A. SMITH ET AL   2,598,846
FLY ROD REEL
Filed Aug. 14, 1948                     2 SHEETS—SHEET 1
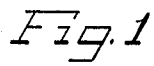
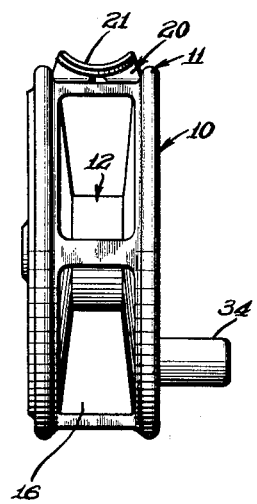
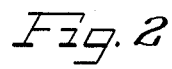
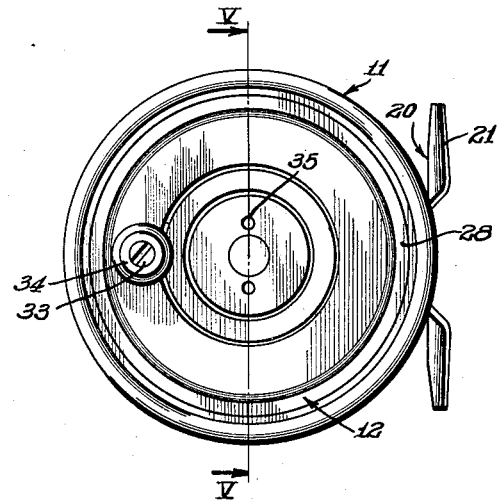
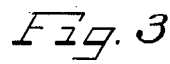
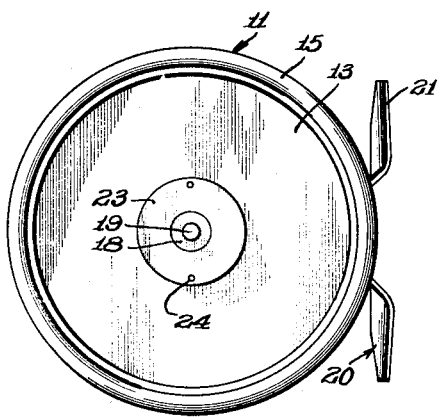
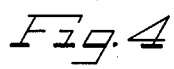
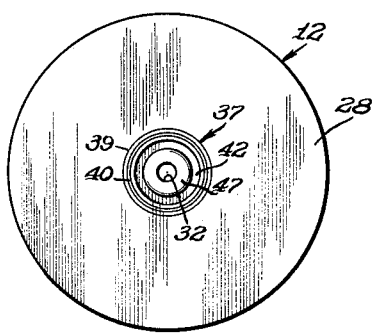
Inventor
Philip A. Smith
Lewis Hopps June 3, 1952  P. A. SMITH ET AL  2,598,846
FLY ROD REEL
Filed Aug. 14, 1948  2 SHEETS—SHEET 2
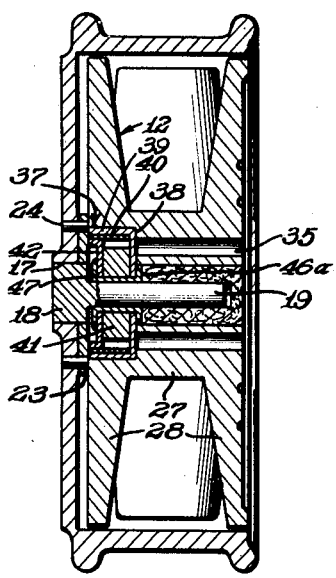
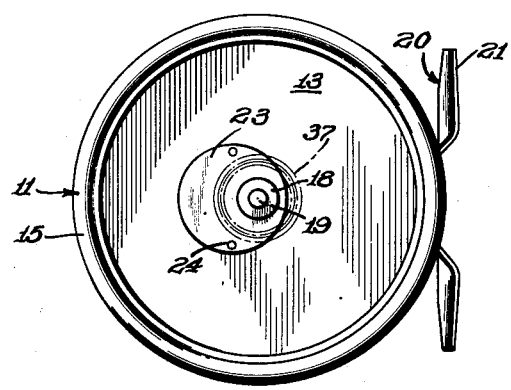
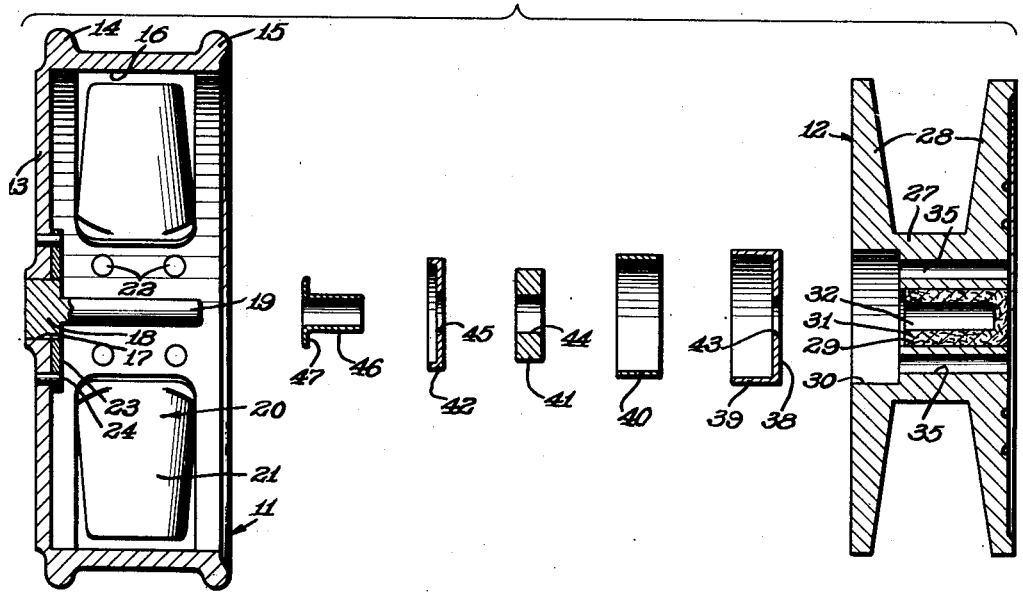
Inventor
Philip A. Smith
Lewis Hopps Patented June 3, 1952

2,598,846

UNITED STATES PATENT OFFICE 2,598,846

FLY ROD REEL

Philip A. Smith, Pelham Manor, N. Y., and Lewis Hopps, Darien, Conn., assignors to The Indiana Steel Products Company, Chicago, Ill., a corporation of Illinois Application August 14, 1948, Serial No. 44,295

7 Claims. (Cl. 242—84.5)

This present invention relates to a fly rod reel and more particularly to a fly rod reel in which magnetic means are employed to retain the component parts of the reel in assembled position and to impart a desired "drag" to the reel.

In the reel of the present invention, magnetic means are provided for retaining a spool, upon which the fishing line is coiled, in position within a suitable frame providing a spindle upon which the spool is mounted. A permanent magnet is attached in fixed position to either the spool or the frame to cooperate with magnetizable material carried by the other member to retain the spool in position upon the spindle within the frame. The mechanical friction set up by reason of the attraction between the magnet and the magnetizable material upon rotation of the spool in the frame serves to resist movement of the spool within the frame to exert a desired drag effect upon movement of the spool.

It is, therefore, an important object of the present invention to provide a fly casting reel of extremely simple and economical construction employing a magnetic couple to maintain the component parts of the reel in assembled position.

It is a further important object of the present invention to provide a fly casting reel in which a spool member is maintained in position within a frame member for rotation therein by means of a permanent magnet carried by one of the members coacting with magnetizable material carried by the other of said members.

It is a still further important object of the present invention to provide a fly casting reel comprising a spool rotatably disposed on a spindle carried by a frame surrounding the spool and a permanent magnet carried by the spool cooperating with magnetizable material carried by the frame for maintaining the spool positioned within the frame, the magnetic attraction between the permanent magnet and the magnetizable material resisting rotation of the spool within the frame.

Other and further important objects of this invention will be apparent from the disclosures in the specification and the accompanying drawings.

On the drawings:

Figure 1 is a front elevational view of a reel of the present invention;

Figure 2 is a side elevation of the reel of Figure 1;

Figure 3 is a side elevation of the frame member of the reel of the present invention with the spool removed;

Figure 4 is a side elevational view of the spool of the reel of the present invention;

Figure 5 is a view taken along the plane V—V of Figure 2;

Figure 6 is an exploded sectional view similar to Figure 5; and

Figure 7 is a side elevational view of a modified frame member of the reel of the present invention.

As shown on the drawings:

Reference numeral 10 refers to a fly casting reel of the present invention comprising generally a frame member 11 and a spool 12 rotatably disposed within the frame member 11.

The cylindrical, cup-like frame member 11 is formed as an integral hollow casting having a circular backing plate 13 and spaced, beaded peripheral edges 14 and 15. The curved side walls of the frame are apertured as at 16 to reduce the weight of the casting and to provide an opening for winding or unwinding a fishing line on the spool as in conventional reels. The backing plate 13 is centrally apertured as at 17 to receive the enlarged circular shank 18 of a spindle 19 projecting forwardly of and normal to the backing plate 13. A conventional clip 20, having arcuate spring-like extension arms 21, is secured to the frame 11, as by rivets 22, for attaching the reel to a fly rod by conventional means. A disk 23, formed of suitable magnetic material, is mounted in a central position on the backing surface 13. The disk 23 is centrally apertured to receive the shank 18 of spindle 19 and is retained in position on the interior face of the frame 11 by suitable fastening means, as by pins 24.

The frame 11, with the exception of the disk 23, may be suitably cast as an integral assembly, the assembly being preferably cast of a non-magnetic material such as aluminum, magnesium, an aluminum or magnesium alloy or suitable plastic material.

The spool 12 comprises generally a cylindrical hub 27 having integrally formed peripheral flanges 28 cooperating with the core 27 to define a generally V-shaped, annular winding notch for receiving and maintaining in position a fishing line wound about the hub 27. The hub 27 has an axially extending bore 29 extending therethrough and is counterbored at 30 to provide a cylindrical recess concentric with and of greater diameter than the aperture 29. A fiber plug 31 is inserted in the aperture 29 and has a central recess 32 formed therein to receive the spindle 19 when the spool 12 is assembled within the frame 11. A screw 33, threadedly retained by the spool 12, secures a turning handle 34 to the outside surface of the spool, the handle 34 being adapted for rotating the spool within the frame. A pair of apertures 35 extending from the outer periphery of the spool 12 into communication with the recess 30 are provided for a purpose to be hereinafter more fully explained.

A magnet assembly 37 is press-fitted into the recess 30 in a position to be flush with the outer surface of the spool 12. As illustrated in Figure 6, the magnet assembly 37 includes a magnetizable circular pole piece 38 having a peripheral cylindrical flange 39 formed integrally therewith, the pole piece 38 being adapted to be seated in the recess 30 upon the shoulders provided in the spool hub 27. A non-magnetic cylindrical sleeve 40 is positioned within the pole piece 38 in surface contact with the interior surfaces of the flange 39. A cylindrical permanent magnet 41 is seated within the spacer sleeve 40 and the pole piece 38, one plane end surface of the magnet abutting the inner circular face of the pole piece 38. A second pole piece 42 of magnetic material is adapted to abut the other plane surface of the permanent magnet 41, the pole piece 42 being formed as a cup fitting tightly within the spacer sleeve 40. The pole piece 38, the magnet 41 and the pole piece 42 are each centrally apertured as at 43, 44 and 45, respectively, the apertures 43—45 being concentric and of the same diameter. A hollow rivet 46, formed of suitable non-magnetic material and extending through the apertures 43—45, is employed to maintain the pole pieces, the spacer sleeve and the magnet in assembled relation. The rivet 46 is provided with an integral peripheral flange 47 abutting the outer face of the pole piece 42 and the other extremity of the rivet 46 is turned outwardly as at 46a to abut the outer face of the pole piece 38 to hold the magnet assembly 37 together.

As shown in Figure 5, the magnet assembly 37 is press fitted within the recess 30 to fit tightly therein and to be retained in position centrally of the spool 12. The magnet assembly may be removed by merely inserting a pair of pins in the apertures 35 to contact the rear face of the pole piece 38 and applying force to eject the assembly 37. When the spool is assembled within the frame 11 upon the spindle 19, which extends through the center of the hollow rivet 46 and into the recess 32 provided in the fiber plug 31, the pole pieces 38 and 42 and the spacer sleeve 40 abut the disk 23 carried centrally on the interior face of the backing wall 13. The disk 23, being made of magnetizable material, is attracted by the magnet 41 through the pole pieces 38 and 42, the magnetic attraction between the magnet assembly and the plate 23 serving to hold the spool within the frame. The magnetic couple holding the spool within the frame also tends to resist the rotation of the spool within the frame, the mechanical magnetic friction thus generated serving to dampen any movement of the spool within the frame. The amount of mechanical magnetic friction resisting the movement of the spool within the frame may be varied by varying the size of the magnet 41, the composition of the magnet or of the plate 23, or by varying the position of the plate 23 with respect to the magnet assembly 37 carried by the spool.

In the modification illustrated in Figure 7, the position of the plate 23 has been changed so that the plate is no longer concentric with the spindle. Accordingly, a smaller area of the plate is in surface contact with the poles 38 and 42 of the magnet assembly 37 when the spool 12 is in position within the frame 11. The position of the magnet assembly 37 upon assembly of the spool within the frame is illustrated in dotted lines to show that area of the plate which is subject to magnetic attraction. Accordingly, by reducing the amount of magnetic attraction, the magnitude of the mechanical magnetic friction generated upon rotation of the spool is reduced and the resistance to movement of the spool is lessened. In this manner, by merely changing the position of the plate 23, the drag of the reel may be varied throughout a wide range. If desired, the plate 23 may be eccentrically pivoted to the backing plate 13 so that the position of the plate relative to the permanent magnet poles 38 and 42 may be changed as desired to vary the magnetic drag of the device by means of a very simple adjustment.

Thus, it may be seen that the present invention provides a fly casting reel of extremely simple construction employing a magnetic couple between the spool and the frame to maintain the spool and frame in assembled position. Further, the relative position of the magnetic means within the reel may be easily changed. For example, it may be desirable to mount a permanent magnet, such as the magnet assembly 37 upon the frame member 11 and the plate of magnetic material upon the spool 12. In this manner, the structure of the spool may be simplified and a plurality of spools carrying different weights of fishing line may be provided so that the angler may have a plurality of sizes and weights of line at his disposal and may change the line by merely changing spools.

It will be understood that various details of construction may be varied through a wide range without departing from the principles of this invention and it is, therefore, not the purpose to limit the patent granted hereon otherwise than necessitated by the scope of the appended claims.

We claim as our invention:

1. A fly casting reel comprising a stationary frame member, a spool rotatably disposed within said frame, and magnetic means including a magnet and ferro-magnetic material concentric with said spool and disposed within said reel for relative rotation upon movement of said spool for establishing a magnetic couple between said frame member and spool for maintaining the spool in position within the frame, one of said magnetic means being fixed relative to said frame member and the other of said magnetic means being fixed to said spool for resisting rotation of the spool within the frame.

2. A fly casting reel comprising a stationary frame, a spindle mounted on said frame and concentric therewith, a spool mounted on said spindle and rotatable within said frame, magnetizable material as a part of said frame adjacent to and concentric with said spindle and a permanent magnet as a part of said spool having spaced pole pieces concentric with said spool and bridged by said magnetizable material to maintain said spool in position upon said spindle and to resist rotation of said spool about said spindle.

3. A fly casting reel comprising a stationary generally cylindrical frame, a spindle carried by said frame and concentric therewith, a spool rotatably mounted on said spindle for rotation within said frame, magnetic means for maintaining said spool in position within said frame including magnetizable material as a part of said frame disposed about said spindle and a permanent magnet as a part of said spool concentric with said spindle and having nesting pole pieces adjacent to and bridged by said magnetizable material.

4. A fly casting reel comprising a stationary hollow cylindrical frame member, a centrally extending, concentric spindle mounted on said frame, a circular plate of magnetizable material fixedly mounted on said frame about said spindle, a spool having a cylindrical core and peripheral flanges extending beyond said core, said core being centrally apertured to receive said spindle for rotatably mounting the spool within said frame and having a central recess formed in one face thereof, a permanent magnet secured in said recess for contacting said magnetizable material when said spool is mounted on said spindle, the magnetic attraction between said magnetizable material and said magnet serving to maintain the spool in position within said frame and tending to resist rotation of said spool about said spindle.

5. In a fly casting reel having a stationary non-magnetic cylindrical frame member and a non-magnetic spool member removably mounted in said frame for rotation therein, magnetic means for maintaining said spool in position within said frame including a permanent magnet fixedly secured to one of said members and magnetic material fixed to the other of said members, said magnet having pole pieces in close magnetic couple with said magnetic material when said spool is positioned within said frame to resist movement of said spool within said frame.

6. In a fly casting reel having a stationary hollow cylindrical non-magnetic frame carrying a central spindle and a non-magnetic spool removably mounted on said spindle for rotation within said frame, magnetic means for maintaining said spool in position within said frame comprising a magnet assembly centrally mounted in said spool and apertured to receive said spindle, said assembly including a cylindrical permanent magnet and nested pole pieces concentric with said magnet and extending axially therebeyond, and a disk of magnetic material mounted on said frame to abut said pole pieces when said spool is positioned within said frame to resist movement of said spool within said frame.

7. A fly casting reel comprising a stationary cylindrical frame member of non-magnetizable material, a spindle mounted on said frame and concentric therewith, a spool mounted on said spindle and rotatable thereon within said frame, means for rotating said spool within said frame, and magnetic means including a permanent magnet and magnetizable material, one of said magnet means being carried by said spool and fixed relative thereto and the other of said magnet means being carried by said frame and fixed relative thereto, said magnetic means being mounted adjacent to and concentric with said spindle and within the magnetic influence of each other to tend to maintain said spool on said spindle and to resist rotation of said spool about said spindle.

PHILIP A. SMITH.
LEWIS HOPPS.

REFERENCES CITED

The following references are of record in the file of this patent:

UNITED STATES PATENTS

| Number | Name | Date |
|---|---|---|
| 397,198 | Meisselbach et al. | Feb. 5, 1889 |
| 1,236,965 | Miller | Aug. 14, 1917 |
| 1,612,178 | Catcucci | Dec. 28, 1926 |
| 1,871,386 | Pflueger | Aug. 9, 1932 |
| 1,984,778 | Tross | Dec. 18, 1934 |
| 2,465,932 | Romine | Mar. 29, 1949 |
| 2,527,391 | Blais | Oct. 24, 1950 |